United States Patent
Yagishita

(10) Patent No.: US 9,535,538 B2
(45) Date of Patent: Jan. 3, 2017

(54) SYSTEM, INFORMATION PROCESSING APPARATUS, AND INFORMATION PROCESSING METHOD

(71) Applicant: Takahiro Yagishita, Kanagawa (JP)

(72) Inventor: Takahiro Yagishita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 295 days.

(21) Appl. No.: 14/168,129

(22) Filed: Jan. 30, 2014

(65) Prior Publication Data

US 2014/0253511 A1 Sep. 11, 2014

(30) Foreign Application Priority Data

Mar. 5, 2013 (JP) .................................. 2013-043392

(51) Int. Cl.
*G06F 3/042* (2006.01)
*G06F 1/16* (2006.01)

(52) U.S. Cl.
CPC ........... *G06F 3/0425* (2013.01); *G06F 1/1639* (2013.01); *G06F 3/0421* (2013.01)

(58) Field of Classification Search
CPC ..... G06F 3/0421; G06F 3/0425; G06F 1/1639
See application file for complete search history.

(56) References Cited

U.S. PATENT DOCUMENTS

| | | | |
|---|---|---|---|
| 4,875,063 A | 10/1989 | Idenawa et al. | |
| 4,918,489 A | 4/1990 | Inage et al. | |
| 4,977,414 A | 12/1990 | Shimada et al. | |
| 5,019,913 A | 5/1991 | Kiya et al. | |
| 5,107,278 A | 4/1992 | Shimada et al. | |
| 5,491,506 A | 2/1996 | Yagishita et al. | |
| 5,565,907 A | 10/1996 | Wada et al. | |
| 5,923,828 A | 7/1999 | Yagishita | |
| 6,480,623 B1 | 11/2002 | Yagishita et al. | |

(Continued)

FOREIGN PATENT DOCUMENTS

| | | |
|---|---|---|
| CN | 102455779 A | 5/2012 |
| JP | 2000-200149 | 7/2000 |

(Continued)

OTHER PUBLICATIONS

Combined Office Action and Search Report issued on Jul. 5, 2016 in Chinese Patent Application No. 201410075195.6 (with English language translation).

*Primary Examiner* — Tom Sheng
(74) *Attorney, Agent, or Firm* — Oblon, McClelland, Maier & Neustadt, L.L.P.

(57) ABSTRACT

A system includes: a projection unit that projects an image on a projection object; an image capturing unit that captures an image of a target object present in an optical path of projection light projected from the projection unit; a detection unit that detects light reflected from the target object, based on a captured image captured by the image capturing unit; a judging unit that judges position information of the target object in target space that corresponds to the image projected by the projection unit, based on the captured image; and an identification unit that identifies a projection area on the projection object in which the image is projected, based on the light reflected from the target object detected by the detection unit and the position information judged by the judging unit.

19 Claims, 8 Drawing Sheets

(56) References Cited

U.S. PATENT DOCUMENTS

| | | | |
|---|---|---|---|
| 6,507,674 B1 | 1/2003 | Yagishita et al. | |
| 6,519,052 B1 | 2/2003 | Oneda et al. | |
| 6,556,707 B1 | 4/2003 | Yagishita et al. | |
| 6,704,455 B1 | 3/2004 | Yamazaki et al. | |
| 6,788,811 B1 | 9/2004 | Matsuura et al. | |
| 7,046,387 B1 | 5/2006 | Yagishita et al. | |
| 2001/0043752 A1 | 11/2001 | Matsuura et al. | |
| 2002/0031276 A1 | 3/2002 | Yagishita et al. | |
| 2002/0191224 A1 | 12/2002 | Yagishita et al. | |
| 2002/0191855 A1 | 12/2002 | Matsuura et al. | |
| 2003/0010888 A1* | 1/2003 | Shimada | G01J 1/32 250/201.1 |
| 2003/0012445 A1 | 1/2003 | Matsuura et al. | |
| 2003/0039390 A1 | 2/2003 | Yagishita et al. | |
| 2003/0048923 A1 | 3/2003 | Yagishita et al. | |
| 2003/0128881 A1 | 7/2003 | Yagishita et al. | |
| 2003/0198397 A1 | 10/2003 | Matsuura et al. | |
| 2004/0071364 A1 | 4/2004 | Yamazaki et al. | |
| 2004/0114819 A1 | 6/2004 | Matsuura et al. | |
| 2004/0130738 A1 | 7/2004 | Yagishita et al. | |
| 2004/0131265 A1 | 7/2004 | Yagishita et al. | |
| 2004/0170329 A1 | 9/2004 | Yagishita et al. | |
| 2004/0179239 A1 | 9/2004 | Yamazaki et al. | |
| 2004/0208339 A1 | 10/2004 | Abe et al. | |
| 2006/0001650 A1* | 1/2006 | Robbins | G06F 3/0421 345/173 |
| 2006/0230332 A1* | 10/2006 | Lin | G09B 5/06 715/203 |
| 2007/0071283 A1 | 3/2007 | Yagishita | |
| 2009/0021794 A1 | 1/2009 | Hara et al. | |
| 2009/0262098 A1* | 10/2009 | Yamada | G06F 1/1616 345/175 |
| 2010/0046044 A1 | 2/2010 | Ishizu et al. | |
| 2011/0051173 A1 | 3/2011 | Yagishita | |
| 2011/0080575 A1* | 4/2011 | Takahashi | G06F 3/0425 356/51 |
| 2011/0291990 A1* | 12/2011 | Kiyose | F16M 13/02 345/175 |
| 2012/0062518 A1* | 3/2012 | Cable | G06F 3/0421 345/175 |
| 2012/0236344 A1 | 9/2012 | Nagase et al. | |
| 2013/0070213 A1* | 3/2013 | Chikaoka | G09G 3/025 353/69 |
| 2013/0222237 A1* | 8/2013 | Jesme | G06F 3/0425 345/156 |
| 2013/0307773 A1 | 11/2013 | Yagishita | |
| 2014/0111479 A1* | 4/2014 | Krah | G06F 3/0421 345/175 |
| 2014/0218341 A1* | 8/2014 | Ichieda | G06F 3/0425 345/175 |
| 2014/0313166 A1* | 10/2014 | Rattray | H04N 9/3179 345/175 |

FOREIGN PATENT DOCUMENTS

| | | |
|---|---|---|
| JP | 2009-258569 | 11/2009 |
| WO | WO 2012/173001 A1 | 12/2012 |

\* cited by examiner

SYSTEM, INFORMATION PROCESSING APPARATUS, AND INFORMATION PROCESSING METHOD

CROSS-REFERENCE TO RELATED APPLICATIONS

The present application claims priority to and incorporates by reference the entire contents of Japanese Patent Application No. 2013-043392 filed in Japan on Mar. 5, 2013.

BACKGROUND OF THE INVENTION

1. Field of the Invention

The present invention relates to a system, an information processing apparatus, and an information processing method.

2. Description of the Related Art

A user interface (UI) device has conventionally been proposed which enables a user to use unoccupied space in front of a display screen as a virtual operation surface. The user can use the virtual operation surface as a touch panel and enter an operation input by moving a finger or the like (target object) while viewing an image displayed on the display screen.

In the UI device, correspondence between the position of the target object in real space (virtual operation surface) and the position of the target object on the display screen is important. For example, Japanese Patent Application Laid-open No. 2000-200149 discloses a technique in which an image for calibration (that means processing for determining correspondence relation between the position of a target object in real space and the position of the target object on a display screen), which causes specified marks to be displayed at four corners of a rectangular image, is displayed, and the positions (the positions in real space) of a hand, which points the specified marks on the projected calibration image, is associated with the positions of the marks on the display screen.

However, in the technique disclosed in Japanese Patent Application Laid-open No. 2000-200149, when the user cannot reach the mark with his/her hand (in such a case where, for example, the above-described calibration image is projected on a big screen), there is a problem in that accurate calibration cannot be performed.

In view of the above-mentioned circumstances, there is a need to provide a system, an information processing apparatus, and an information processing method, which can perform accurate calibration necessary for detecting an instruction operation performed to a projection image.

SUMMARY OF THE INVENTION

It is an object of the present invention to at least partially solve the problems in the conventional technology.

A system includes: a projection unit that projects an image on a projection object; an image capturing unit that captures an image of a target object present in an optical path of projection light projected from the projection unit; a detection unit that detects light reflected from the target object, based on a captured image captured by the image capturing unit; a judging unit that judges position information of the target object in target space that corresponds to the image projected by the projection unit, based on the captured image; and an identification unit that identifies a projection area on the projection object in which the image is projected, based on the light reflected from the target object detected by the detection unit and the position information judged by the judging unit.

An information processing apparatus includes: a detection unit that detects light reflected from a target object, which is present in an optical path of projection light projected from an image projection apparatus which projects an image on a projection object, based on an image captured by an image capturing unit which captures an image of the target object; a judging unit that judges position information of the target object in target space that corresponds to the image projected by the projection unit, based on the captured image; and an identification unit that identifies a projection area on the projection object in which the image is projected, based on the light reflected from the target object detected by the detection unit and the position information judged by the judging unit.

An information processing method includes: a detection step of detecting light reflected from a target object, which is present in an optical path of projection light projected from an image projection apparatus which projects an image on a projection object, based on a captured image captured by an image capturing unit which captures an image of the target object; a judging step of judging position information of the target object in target space that corresponds to the image projected by the image projection apparatus, based on the captured image; and an identification step of identifying a projection area on the projection object in which the image is projected, based on the light reflected from the target object detected in the detection step and the position information judged in the judging step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a system, an information processing apparatus, and an information processing method according to the present invention will be described in detail with reference to the accompanying drawings. Although an ultra-short focus projector is used as an example of the image projection apparatus to which the present invention is applied, the image projection apparatus is not limited thereto. For example, a short focus projector or a long focus projector may be employed as the image projection apparatus to which the present invention is applied.

Here, the term "focus" is synonymous with a projection distance which refers to the distance from a projection surface to an optical position (for example, the distance from a projection port from which projection light is projected to a projection object on which an image is projected). The ultra-short focus projector is shorter in projection distance than the short focus projector, and the short focus projector is shorter in projection distance than the long focus projector. For example, the projection distance may be set to "11.7 to 24.9 cm" for the ultra-short focus projector, "0.7 to 14.6 m" for the short focus projector, and "1.3 m to 32.4 m" for the long focus projector.

(First Embodiment)

Figure 1:
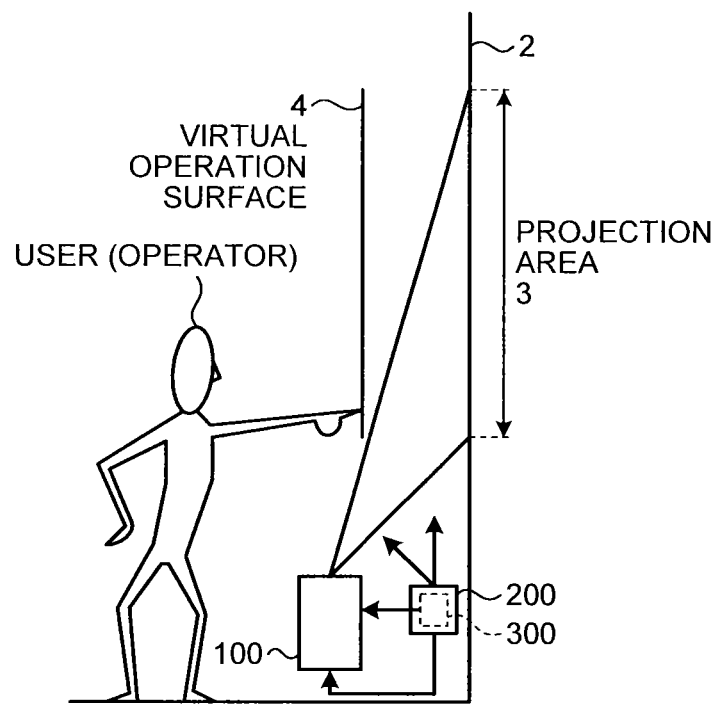
FIG. 1 illustrates a user holding out his hand to a virtual operation surface.

In the present embodiment, as illustrated in FIG. 1, an image is projected on a projection area 3 of a projection object 2 (a wall surface in the example of FIG. 1). A virtual operation surface 4 is assumed to be set in unoccupied space in front of the projection area 3. When a user (operator) performs an instruction operation such as moving a hand (finger) on the virtual operation surface 4, a projector 100 switches images to be projected on the projection area 3 in response to the recognized instruction operation.

In this embodiment, an optical sensor is used in order to recognize an instruction operation in target space (real space including the virtual operation surface 4) that corresponds to the projection area 3. The target space may be perceived as the space corresponding to an image projected by the projector 100. In the case of recognizing an instruction operation with use of the optical sensor, it is necessary to arrange the optical sensor so that a human body is not interposed between the hand (detection object) that performs operation and the optical sensor. In the example of FIG. 1, the optical sensor includes a three-dimensional distance sensor 200 and a camera (a monocular camera in this example) 300. The optical sensor may be perceived as one element of the projector 100.

The three-dimensional distance sensor 200 includes an unillustrated light emission unit which emits infrared light and an unillustrated light receiving unit which receives the light reflected and returned from the hand. The three-dimensional distance sensor 200 is generally used for gesture recognition or the like. The three-dimensional distance sensor 200 can measure a three-dimensional distance between a point irradiated with light (irradiation point) and the three-dimensional distance sensor 200 based on a pattern shape of received light, a light receiving angle, and time taken from light emission to light reception. If three-dimensional positional relationship between the three-dimensional distance sensor 200 and the projection area 3 is known, then the three-dimensional positional relationship between the irradiation point (position of the hand) and the projection area 3 can be measured. From another perspective, it can be regarded as that the three-dimensional distance sensor 200 measures the three-dimensional position of the irradiation point. The three-dimensional distance sensor 200 outputs measurement information indicating a measurement result to the projector 100.

The camera 300 captures an image of a target object (for example, a human hand) which is present in an optical path of projection light projected from the projector 100. In this example, the camera 300 generates a captured image of the target space that corresponds to the projection area 3. From the captured image, information indicating reflected light (such as color and luminance of reflected light) of the target object (which was captured in picture information) which was present in an optical path of projection light can be identified. The camera 300 also outputs the captured image to the projector 100. It can be perceived that the camera 300 corresponds to an "image capturing unit" in the appended claims. In this example, it can also be perceived that the aforementioned optical sensor corresponds to the "image capturing unit" in the appended claims.

Figure 2:
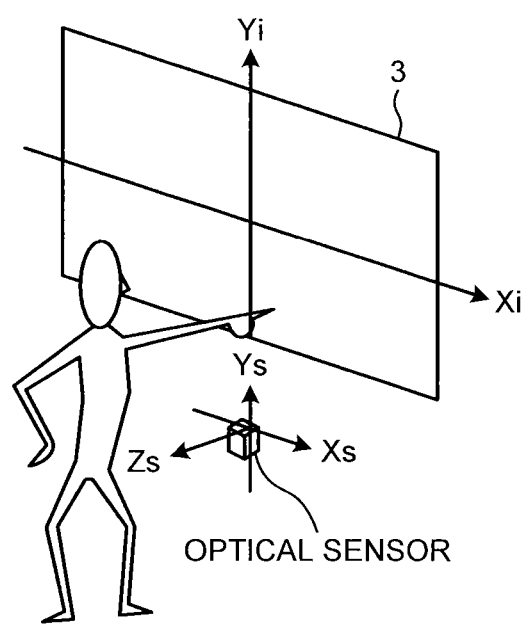
FIG. 2 is an explanatory view of a coordinate system of an embodiment.

Further, in the present embodiment, as illustrated in FIG. 2, a coordinate system of the projection area 3 (a coordinate system of the screen) is set to have the center of the projection area 3 as an origin, a perpendicular direction (gravity acting direction) as Yi axis, and a horizontal direction as Xi axis. The optical sensor is fixed to the projection object 2 (a wall surface). A coordinate system of the real space (target space), which is measured by the optical sensor, is set to have an arbitrary point at the end of the upper surface of the optical sensor at the projection object 2 as an origin, a perpendicular direction as Ys axis, a horizontal direction as Xs axis, and a depth direction (normal line direction of the projection area 3) as Zs axis. However, a way to set the coordinate system is not limited thereto.

Figure 3:
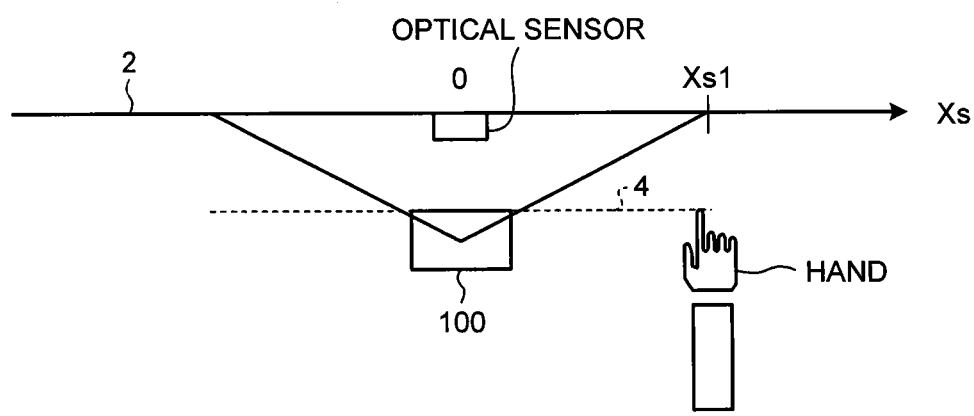
FIG. 3 is an overhead view of FIG. 1 as viewed from the above.
Figure 4:
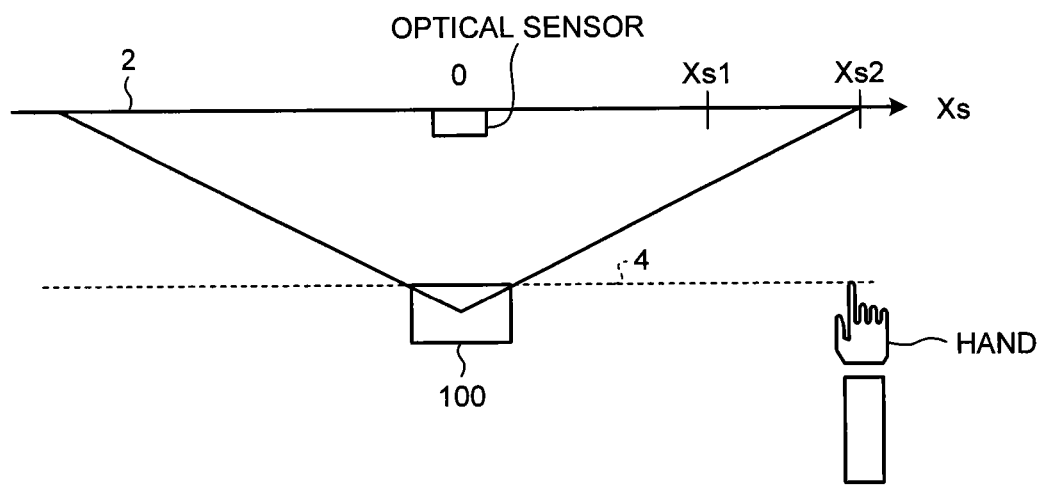
FIG. 4 is a schematic view illustrating coordinate values of a finger on real space when a projector is distanced from a projection object and a projection image size is enlarged.
Figure 5:
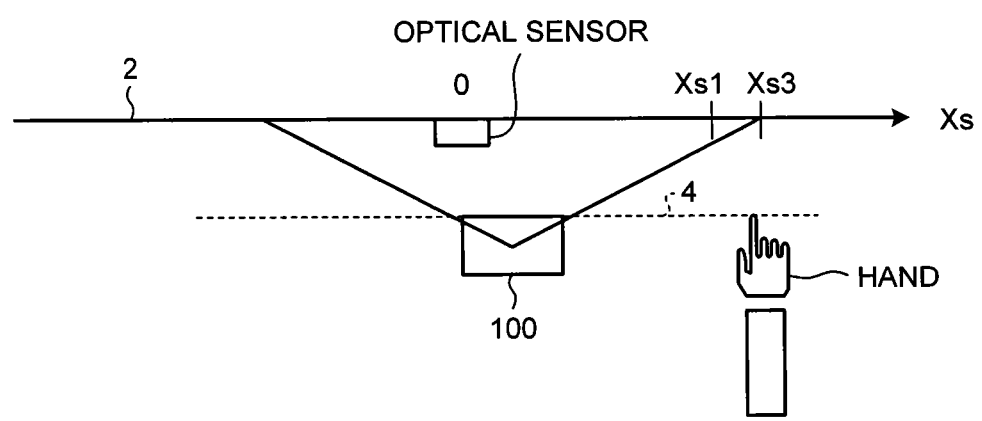
FIG. 5 is a schematic view illustrating coordinate values of the finger on the real space when the projector is moved rightward.

Here, assume that the optical sensor is to be fixed to the projection object 2 (the wall surface) as in the present embodiment. Whenever the projector 100 is moved (whenever the size and projecting position of a projection image change), it is necessary to redo calibration processing which determines correspondence relation between the coordinates (Xs, Ys) of the hand detected by the optical sensor and the coordinates (Xi, Yi) on the projection area 3. For example, in the overhead view of FIG. 3 illustrating FIG. 1 as viewed from the above, an Xs-axis coordinate value of the hand measured by the optical sensor in the state where a right end of an image (projection image) projected on the projection area 3 is pointed by the hand is Xs1. However, when the projector 100 is distanced from the projection object 2 and the projection image size (size of the projection area 3) is enlarged, the Xs-axis coordinate value measured by the optical sensor in the state where the right end of the projected image is pointed by the hand is Xs2 (>Xs1) as illustrated in FIG. 4. Moreover, when the projector 100 is moved rightward (in a positive Xs-axis direction) for example, the Xs-axis coordinate value measured by the optical sensor in the state where the right end of the projected image is pointed by the hand is Xs3 (>Xs1) as illustrated in FIG. 5.

Figure 6:
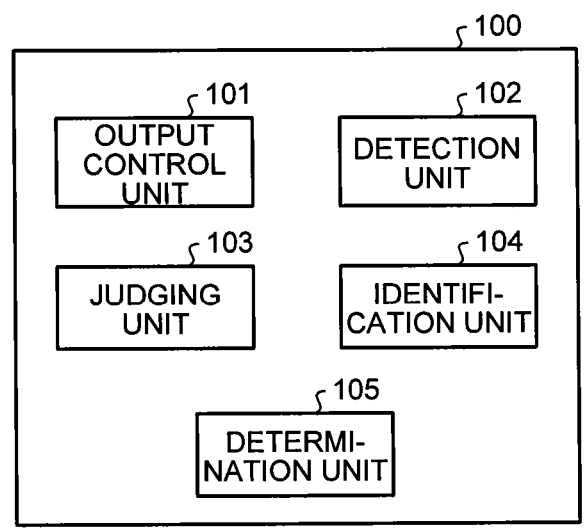
FIG. 6 is a block diagram illustrating a functional configuration example of a projector according to a first embodiment.

In the following description, focus is put on functions relating to calibration processing of the projector 100. FIG. 6 is a block diagram illustrating a functional configuration example of the projector 100 according to the present embodiment. As illustrated in FIG. 6, the projector 100 includes an output control unit 101, a detection unit 102, a judging unit 103, an identification unit 104, and a determination unit 105.

The output control unit 101 performs control to output a calibration image for use in the aforementioned calibration processing which determines correspondence relation between the position of a target object in the target space (coordinate values (Xs, Ys) in the coordinate system of real space) and the position on the projection area 3 (coordinate values (Xi, Yi) in the coordinate system of the projection area 3). In the present embodiment, the output control unit 101 performs control to output a calibration image having different colors depending on positions on the projection area 3. The output control unit 101 corresponds to an "output control unit" in the appended claims.

Figure 7:
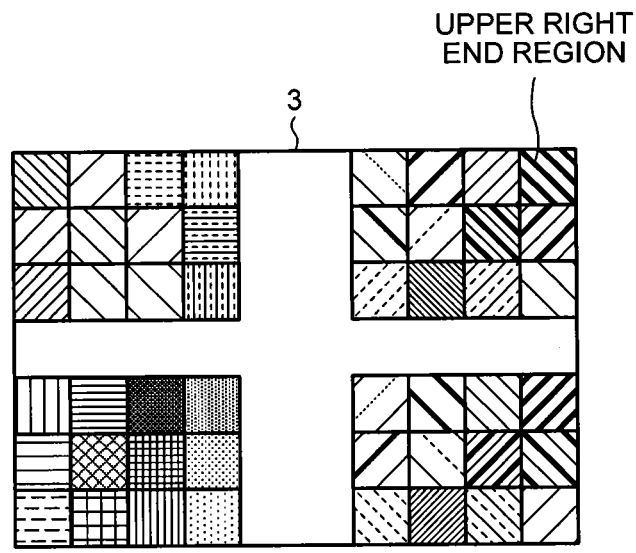
FIG. 7 illustrates one example of a calibration image projected in the first embodiment.

FIG. 7 illustrates one example of a calibration image projected on the projection object 2 by the output control unit 101. However, the configuration of the calibration image is not limited to that illustrated in FIG. 7. In the example of FIG. 7, calibration image data (projection target image data) includes a plurality of image element blocks each including one or more pixels. The respective image element blocks are set to be different in display color from each other. In this example, it can be perceived that each of the image element blocks forms a mark for use in calibration.

The description is continued with reference to FIG. 6 again. Based on an image captured by the camera 300, the detection unit 102 detects light (hereinafter also referred to as "reflected light") reflected from a target object which is present in an optical path of projection light projected from the projector 100. In the present embodiment, color of the reflected light of the target object which is present in the optical path of the projection light is detected based on the image captured by the camera 300. The detection unit 102 corresponds to a "detection unit" in the appended claims.

The judging unit 103 judges the aforementioned position information of the target object in the target space. In the present embodiment, the judging unit 103 judges the aforementioned position information of the target object in the target space (information indicating a three-dimensional position) based on an output (measurement result information) from the three-dimensional distance sensor 200. In this example, since the judging unit 103 knows the three-dimensional positional relationship between the three-dimensional distance sensor 200 and the projection area 3 in advance, the judging unit 103 can judge the position information of the target object from the three-dimensional distance of the target object measured by the three-dimensional distance sensor 200. However, without being limited thereto, the judging unit 103 may be configured to judge position information of the target object in the target space, based on an image captured by the camera 300 for example. The judging unit 103 corresponds to a "judging unit" in the appended claims.

The identification unit 104 identifies the projection area 3 of the projection object 2 on which the image is projected, based on the light reflected from the target object detected by the detection unit 102 and the position information judged by the judging unit 103. The identification unit 104 corresponds to an "identification unit" in the appended claims.

The determination unit 105 determines which position on the projection area 3 the position information judged by the judging unit 103 corresponds to, based on the reflected light detected by the detection unit 102. More specifically, when the aforementioned calibration image is projected on the projection object 2, the determination unit 105 identifies a position of the projection area 3 (coordinate values in the coordinate system of the projection area 3) which is pointed by the target object (for example, a user's finger) based on the reflected light detected by the detection unit 102. The determination unit 105 determines that the identified position on the projection area 3 corresponds to the position information (coordinate values in the coordinate system of the real space) judged by the judging unit 103.

In the present embodiment, the determination unit 105 identifies a position on the projection area 3 which was pointed by the target object, based on color of the reflected light detected by the detection unit 102. More specifically, the determination unit 105 identifies a position on the projection area 3 corresponding to the color of the reflected light detected by the detection unit 102 as the position pointed by the target object. The determination unit 105 corresponds to a "determination unit" in the appended claim.

For example, assume that the calibration image projected on the projection area 3 is configured as illustrated in FIG. 7. In the example of FIG. 7, if a color of an upper right end region in the projection area 3 (a region corresponding to an image element block at the upper right end portion in the image data to be projected) is supposed to be pink, pink projection light is reflected by the user's finger when the user's finger (hand) touches the upper right end portion, and the reflected light is captured in the image captured by the camera 300. Therefore, the pink reflected light is detected in the detection unit 102. In this example, since the determination unit 105 knows correspondence relation between the color of the reflected light and the coordinate values on the projection area 3 (coordinate values in the coordinate system of the projection area) in advance, the determination unit 105 can identify, from the color of the reflected light detected by the detection unit 102, coordinate values on the projection area 3 corresponding to that color. It can be determined that the identified coordinate values corresponds to the position information (real-space position of the finger which is in contact with the projection object 2) judged by the judging unit 103 at that point of time.

In this case, if two positions on the projection area 3, which are different from each other both in the Xi-axis coordinate value and the Yi-axis coordinate value, can be associated with real-space positions of the finger which is in contact with the projection object 2, then association of other positions with the real-space positions of the finger can be obtained by linear interpolation. Therefore, in the present embodiment, the determination unit 105 performs calibration processing for associating a real-space position of the finger which is in contact with the projection object 2 (coordinate values in the coordinate system of the real space) with a position on the projection area 3 two times. The determination unit 105 then performs linear interpolation so as to generate calibration information which associates respective coordinates on the projection area 3 with the real-space coordinate values of the finger which is in contact with the projection object 2.

The number of times of the aforementioned calibration processing is not limited to two as long as it is two or more. For example, the calibration processing may be configured to be performed three times before the calibration information is generated, and/or the calibration processing may be configured to be performed four times before the calibration information is generated. The present embodiment may also be configured so that after the calibration processing is performed two times and before the calibration information is generated, an image is displayed (projected) to prompt the user to select whether or not additional calibration processing is to be performed.

Moreover, in the present embodiment, a general computer device including a CPU, a ROM, and a RAM are mounted on the projector 100. The above-stated functions of the respective units of the projector 100 (the output control unit 101, the detection unit 102, the judging unit 103, the identification unit 104, and the determination unit 105) are implemented by causing the CPU to execute a program stored in the ROM or the like. However, the present invention is not limited to this configuration. At least part of the above-mentioned functions of the respective units of the projector 100 may be implemented by a dedicated hardware circuit.

Figure 8:
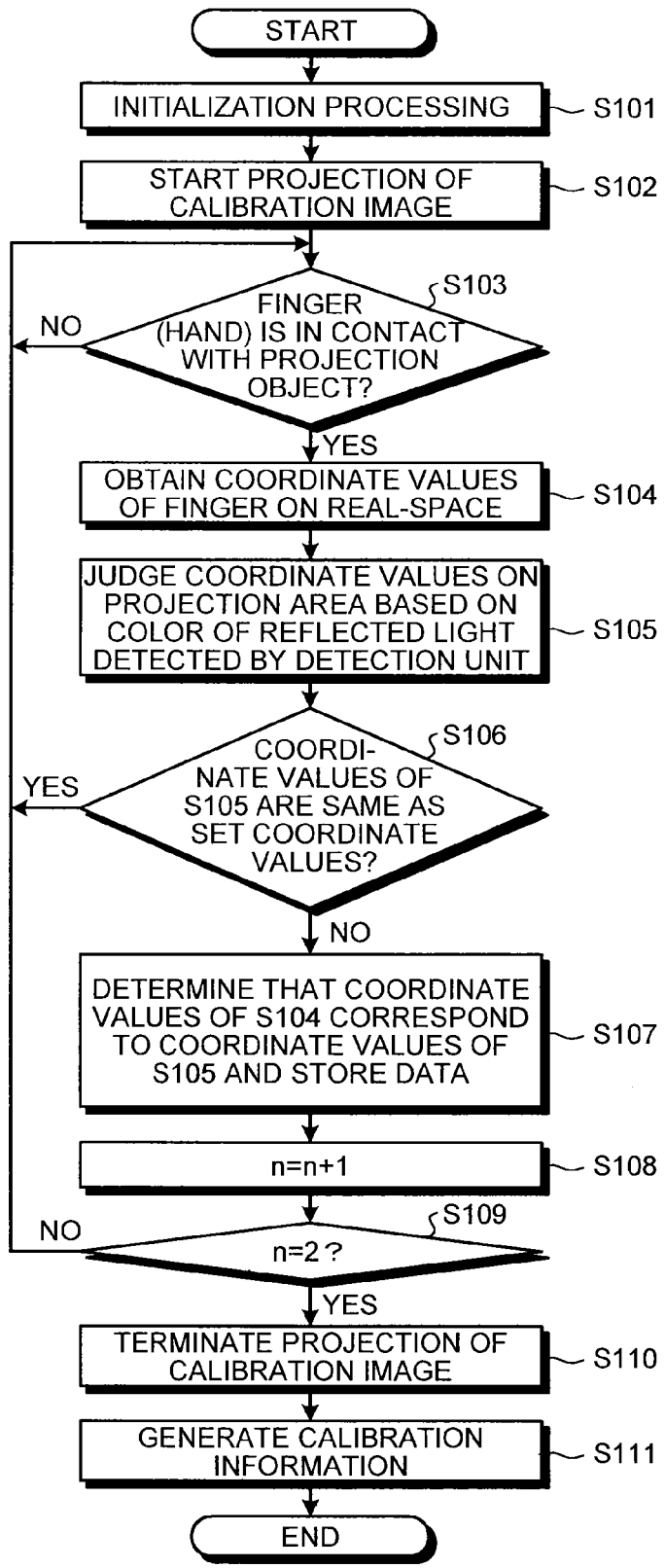
FIG. 8 is a flow chart illustrating one example of processing for generating calibration information in the first embodiment.

Now, with reference to FIG. 8, the processing in which the projector 100 generates the calibration information will be described. FIG. 8 is a flow chart illustrating one example of the processing in which the projector 100 generates calibration information. As illustrated in FIG. 8, the projector 100 (for example, the determination unit 105) first performs initialization processing (step S101). In this example, the projector 100 sets a count value n, which represents the number of times of the calibration processing, to an initial value "0" (n=0). The projector 100 also sets each of an Xi-axis coordinate value Xi[0] and an Yi-axis coordinate value Yi[0] on the projection area 3, which correspond to the first (n=0 in this example) calibration processing, to a default value "null".

Next, the output control unit 101 starts projection of a calibration image (step S102). Then, the determination unit 105 determines whether or not a user's finger (hand) has come into contact with the projection object 2, based on detection by the detection unit 102 (step S103). If it is determined that the user's finger has come into contact with the projection object 2 (step S103: YES), the determination unit 105 obtains from the judging unit 103 position information of the finger (real-space coordinate values of the finger which is in contact with the projection object 2) judged by the judging unit 103 at that point of time (step S104). Next, the determination unit 105 judges coordinate values on the projection area 3 (coordinate values representing the position on the projection area 3 pointed by the user's finger), based on color of the reflected light detected by the detection unit 102 (step S105). The coordinate values on the projection area 3 are identified based on the color of the reflected light according to the method described in the foregoing.

Next, the determination unit 105 determines whether the coordinate values on the projection area 3 judged in the above step S105 are the same as the set coordinate values (step S106). In the first (n=0) calibration processing, the determination unit 105 determines whether or not the coordinate values on the projection area 3 judged in the above step S105 are the same as the default "null" set in the aforementioned initialization processing. In the second and subsequent calibration processings (n≥1), the determination unit 105 determines whether or not the coordinate values on the projection area 3 judged in the above step S105 are the same as the coordinate values on the projection area 3 which have already been associated with real-space coordinate values.

In the above step S106, if it is determined that the coordinate values on the projection area 3 judged in the above step S105 are the same as the set coordinate values (step S106: YES), the processing returns to the above step S103, whereby the processing subsequent to the step S103 is repeated.

If it is determined that the coordinate values on the projection area 3 judged in the above step S105 are not the same as the set coordinate values (step S106: NO), the determination unit 105 determines that the real-space coordinate values obtained in the above step S104 correspond to the coordinate values on the projection area 3 judged in the step S105. Then, the determination unit 105 stores the data in which these are associated, in an unillustrated memory (step S107). In this example, the unillustrated memory also stores the data set in the aforementioned initialization processing. In the first calibration processing, the default values ("null") in the coordinate value Xi[0] and the coordinate value Yi[0] stored in the unillustrated memory are updated to the respective coordinate values judged in the step S105.

Next, the projector 100 (for example, the determination unit 105) increments the count value n, which represents the number of times of the calibration processing, by one (step S108). The projector 100 (for example, the determination unit 105) then determines whether or not the count value has reached 2 (step S109). If it is determined that the count value n has not yet reached 2 (step S109: NO), the processing returns to the above step S103, whereby the processing subsequent to the step S103 is repeated. On the contrary, if it is determined that the count value n has reached 2 (step S109: YES), the output control unit 101 terminates projection of the calibration image (step S110). Then, based on the result of two times of the calibration processing, the determination unit 105 can generate calibration information by performing linear interpolation or the like (step S111).

As described in the foregoing, in the present embodiment, based on the reflected light detected by the detection unit 102, the determination unit 105 determines which position on the projection area 3 the position information (information indicating the position of the target object in the target space) judged by the judging unit 103 corresponds to. More specifically, under the circumstances that the output control unit 101 performs control to output a calibration image having different colors depending on positions on the projection area 3, the determination unit 105 identifies a position on the projection area 3 which is pointed by the target object, based on the color of the reflected light detected by the detection unit 102. The determination unit 105 then determines that the identified position on the projection area 3 corresponds to the position information judged by the judging unit 103 at that point of time. This makes it possible to achieve an advantageous effect of being able to perform accurate calibration processing while allowing the position of the marks for use in calibration to have flexibility.

(Second Embodiment)

Now, a second embodiment of the present invention will be described. In the second embodiment, a calibration image to be projected is different in configuration from the above-described first embodiment. Hereinafter, a specific description will be provided. It is to be noted that a description of component members which are in common with those in the aforementioned first embodiment is omitted accordingly.

Figure 9:
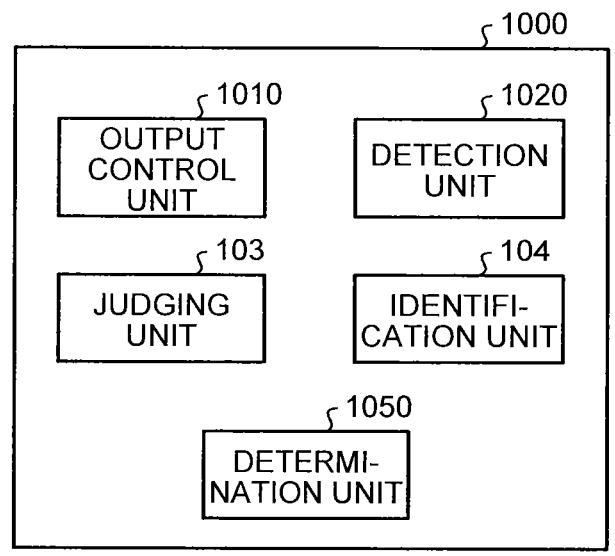
FIG. 9 is a block diagram illustrating a functional configuration example of a projector according to a second embodiment.

FIG. 9 is a block diagram illustrating a functional configuration example of a projector 1000 according to the second embodiment. As illustrated in FIG. 9, the projector 1000 includes an output control unit 1010, a detection unit 1020, a judging unit 103, an identification unit 104, and a determination unit 1050. Since the functions of the judging unit 103 and the identification unit 104 are the same as the first embodiment, a detailed description thereof is omitted.

Figure 10:
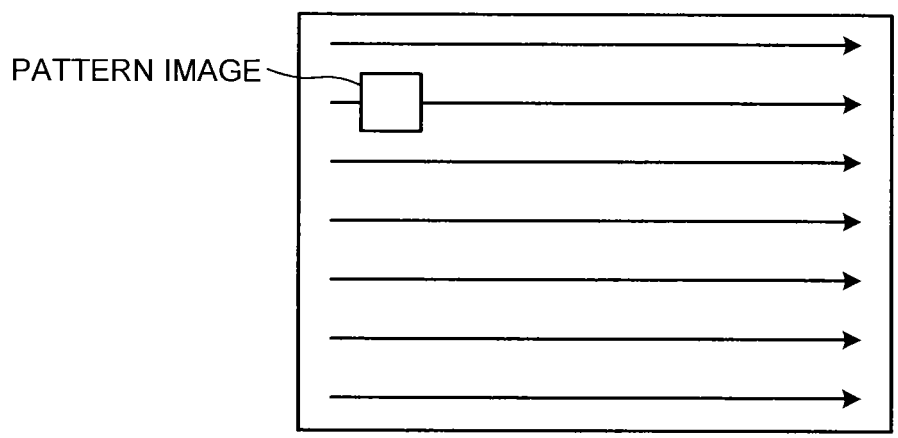
FIG. 10 illustrates one example of a calibration image projected in the second embodiment.

The output control unit 1010 performs control to output a calibration image in which a display position of a pattern image with luminance of a specified value on the projection area 3 changes with time. FIG. 10 illustrates one example of the calibration image projected on the projection object 2 by the output control unit 1010. The configuration of the calibration image is not limited to that illustrated in FIG. 10. FIG. 10 illustrates the configuration in which a high luminance pattern image (mark pattern image) moves in sequence along a raster scanning direction. This configuration can be implemented by loop reproduction of a plurality of frames which have a specified white region (rectangular white region) positioned so as to be shifted little by little from one frame to another frame along the raster scanning direction in an all black background. In the example of FIG. 10, the luminance corresponding to white color corresponds to the luminance of the specified value. In this example, the output control unit 1010 also performs control to notify the determination unit 1050 of the frame number of a calibration image to be projected.

The detection unit 1020 has a function of detecting luminance of reflected light from a target object which is present in an optical path of projection light, based on a captured image coming from the camera 300.

The determination unit 105 identifies a position on the projection area 3 which was pointed by the target object, based on the luminance of the reflected light detected by the detection unit 1020. Furthermore, when the luminance of the reflected light detected by the detection unit 1020 is equal to or more than a specified value, the determination unit 1050 identifies a display position of the pattern image on the projection area 3 at that point of time as the position pointed by the target object. In this example, the determination unit 1050 knows correspondence relation between the frame number notified by the output control unit 1010 and coordinate values representing the display position of the pattern image on the projection area 3 in advance. Accordingly, from the frame number notified by the output control unit 1010, the determination unit 1050 can directly know the display position of the pattern image currently displayed on the projection area 3 (coordinate values in the coordinate system of the projection area 3).

Figure 11:
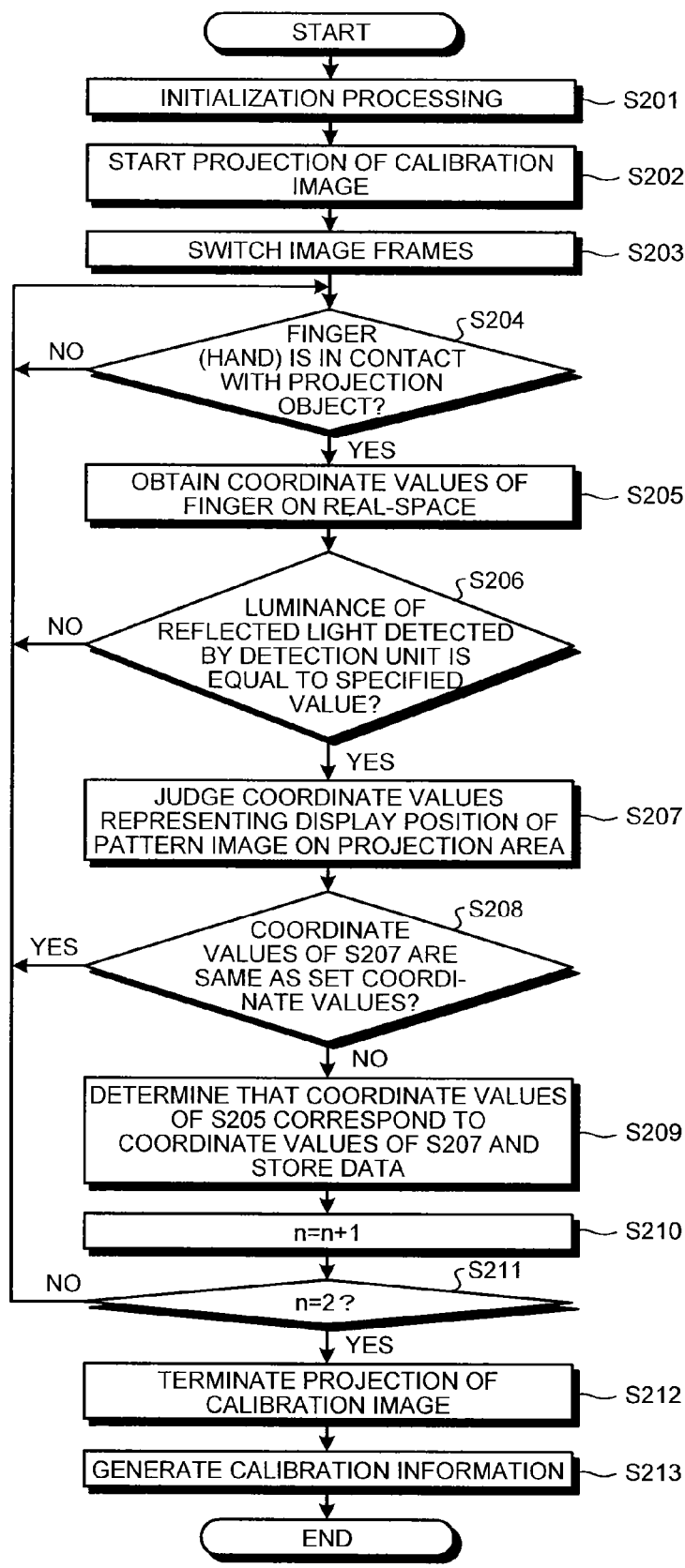
FIG. 11 is a flow chart illustrating one example of processing for generating calibration information in the second embodiment.

Now, with reference to FIG. 11, the processing in which the projector 1000 generates the calibration information is described. FIG. 11 is a flow chart illustrating one example of the processing in which the projector 1000 generates the calibration information. Since the contents of the processing in steps S201 and S202 illustrated in FIG. 11 are the same as the contents of processing in the steps S101 and S102 illustrated in FIG. 8, a detailed description thereof is omitted.

In a step S203, the output control unit 1010 performs control to switch calibration image frames (step S203). As a consequence, the display position of the pattern image on the projection area 3 also changes. Next, based on detection by the detection unit 102, the determination unit 1050 determines whether or not a user's finger has come into contact with the projection object 2 (step S204). If it is determined that the user's finger has not come into contact with the projection object 2 (step S204: NO), the processing returns to the above step S203, and the output control unit 1010 performs control to switch to the next frame.

Contrary to this, if it is determined that the user's finger has come into contact with the projection object 2 (step S204: YES), the determination unit 1050 obtains position information (real-space coordinate values of the finger which is in contact with the projection object 2) judged by the judging unit 103 at that point of time from the judging unit 103 (step S205). The determination unit 1050 then determines whether or not the luminance of the reflected light detected by the detection unit 1020 is equal to a specified value (step S206).

If it is determined in the above step S206 that the luminance of the reflected light detected by the detection unit 1020 is not equal to the specified value (step S206: NO), the processing returns to the above step S203, and the output control unit 1010 performs control to switch to the next frame. Contrary to this, if it is determined that the luminance of the reflected light detected by the detection unit 1020 is equal to the specified value (step S206: YES), the determination unit 1050 judges coordinate values, which represent the display position of the pattern image on the projection area 3, from the frame number (the frame number notified by the output control unit 1010) of the calibration image projected at that point of time (step S207).

Next, the determination unit 1050 determines whether or not the coordinate values on the projection area 3 judged in the above step S107 are the same as the set coordinate values (step S208). The contents of the processing are the same as those of the processing in the step S105 illustrated in FIG. 8.

If it is determined in the above step S208 that the coordinate values on the projection area 3 judged in the above step S207 are the same as the set coordinate values (step S208: YES), the processing returns to the above step S203, whereby the processing subsequent to the step S203 is repeated.

If it is determined that the coordinate values on the projection area 3 judged in the step S107 are not the same as the set coordinate values (step S208: NO), the determination unit 1050 determines that the real-space coordinate values obtained in the above step S205 correspond to the coordinate values on the projection area 3 judged in the step S207. Then, the determination unit 105 stores the coordinate value association data in an unillustrated memory (step S209). The contents of the processing are the same as those of the processing in the step S107 illustrated in FIG. 8.

Since the contents of the processings of the next step S210 and the subsequent steps thereto are the same as the contents of the processings of the step S108 and the subsequent steps thereto illustrated in FIG. 8, a detailed description thereof is omitted. Also in the present embodiment, the effect similar to that in the aforementioned first embodiment can be achieved.

For example, the functions relating to the aforementioned calibration processing (the output control units 101 and 1010, the detection units 102 and 1020, the judging unit 103, the identification unit 104, and the determination units 105 and 1040) may be configured to be mounted on an information processing apparatus which is connected to the projector. In short, the present invention is also applicable to the information processing apparatus. The information processing apparatus according to the present invention may be configured to include at least the detection unit, the judging unit, and the identification unit. The detection unit is configured to detect light reflected from a target object which is present in an optical path of projection light projected from an image projection apparatus which projects an image on a projection target, based on an image captured by the image capturing unit which captures an image of the target object. The judging unit is configured to judge position information of the target object in target space that corresponds to the image projected by the image projection apparatus, based on the captured image. The identification unit is configured to identify a projection area on the projection object in which the image is projected, based on the light reflected from the target object detected by the detection unit and the position information judged by the judging unit.

The functions of the respective units included in the aforementioned projector (100, 1000) may be configured to be mounted on the projector and on the information processing apparatus connected to the projector, in a distributed manner. In short, the present invention is also applicable to a system including the projector and the information processing apparatus connected to the projector. The system according to the present invention may be configured to include at least the projection unit, the image capturing unit, the detection unit, the judging unit, and the identification unit. The projection unit is configured to project an image on a projection object. The image capturing unit is configured to capture an image of a target object which is present in an optical path of projection light projected from the projection unit. The detection unit is configured to detect light reflected from the target object based on an image captured by the image capturing unit. The judging unit is configured to judge position information of the target object in target space that corresponds to the image projected by the projection unit, based on the captured image. The identification unit is configured to identify a projection area on the projection object in which the image is projected, based on the light reflected from the target object detected by the detection unit and the position information judged by the judging unit.

A program executed in the aforementioned projectors (100, 1000) may be configured to be provided in the form of being recorded on a computer readable recording medium, such as a CD-ROM, a flexible disk (FD), a CD-R, and a digital versatile disk (DVD), in an installable or executable file format.

Further, the program executed in the aforementioned projectors (100, 1000) may be configured to be provided in the form of being stored on a computer that is connected to a network such as the Internet and being download via the network. The program executed in the aforementioned projectors (100, 1000) may also be configured to be provided or distributed via a network such as the Internet.

The embodiment can achieve an advantageous effect of being able to provide a system, an information processing apparatus, and an information processing method, which can perform accurate calibration necessary to detect an instruction operation performed to a projection image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system, comprising:
    a projection unit that projects an image on a projection object;
    an image capturing unit that captures an image of a target object present in an optical path of projection light projected from the projection unit;
    a detection unit that detects light reflected from the target object, based on a captured image captured by the image capturing unit;
    a judging unit that judges position information of the target object in target space, between the target object and the projection object, that corresponds to the image projected by the projection unit, based on the captured image; and
    an identification unit that identifies a projection area on the projection object in which the image is projected, based on the light reflected from the target object detected by the detection unit and the position information judged by the judging unit.

2. The system according to claim 1, further comprising a determination unit that determines which position on the projection area the position information judged by the judging unit corresponds to, based on the light reflected from the target object detected by the detection unit.

3. The system according to claim 2, further comprising an output control unit that performs control to output a calibration image for use in calibration processing which determines correspondence relation between a position of the target object in the target space and a position on the projection area, wherein
    when the calibration image is projected on the projection object, the determination unit identifies a position on the projection area pointed by the target object based on the light reflected from the target object detected by the detection unit, and determines that the identified position on the projection area corresponds to the position information judged by the judging unit.

4. The system according to claim 3, wherein the output control unit performs control to output the calibration image having different colors depending on positions on the projection area.

5. The system according to claim 4, wherein the determination unit identifies the position on the projection area pointed by the target object, based on color of the light reflected from the target object detected by the detection unit.

6. The system according to claim 5, wherein the determination unit identifies a position on the projection area that corresponds to the color of the light reflected from the target object detected by the detection unit as the position pointed by the target object.

7. The system according to claim 3, wherein the output control unit performs control to output the calibration image in which a display position of a pattern image with luminance of a specified value on the projection area changes with time.

8. The system according to claim 7, wherein the determination unit identifies the position of the projection area pointed by the target object, based on luminance of the light reflected from the target object detected by the detection unit.

9. The system according to claim 8, wherein when the luminance of the light reflected from the target object detected by the detection unit is equal to or more than the specified value, the determination unit identifies the display position of the pattern image on the projection area obtained at that point of time as the position pointed by the target object.

10. An information processing apparatus, comprising:
    a detection unit that detects light reflected from a target object, which is present in an optical path of projection light projected from an image projection apparatus which projects an image on a projection object, based on an image captured by an image capturing unit which captures an image of the target object;
    a judging unit that judges position information of the target object in target space, between the target object and the projection object, that corresponds to the image projected by the image projection apparatus, based on the captured image; and an identification unit that identifies a projection area on the projection object in which the image is projected, based on the light reflected from the target object detected by the detection unit and the position information judged by the judging unit.

11. The information processing apparatus according to claim 10, further comprising a determination unit that determines which position on the projection area the position information judged by the judging unit corresponds to, based on the light reflected from the target object detected by the detection unit.

12. The information processing apparatus according to claim 11, further comprising an output control unit that performs control to output a calibration image for use in calibration processing which determines correspondence relation between a position of the target object in the target space and a position on the projection area, wherein when a calibration image for use in calibration processing which determines correspondence relation between a position of the target object in the target space and a position on the projection area is projected on the projection object, the determination unit identifies a position on the projection area pointed by the target object based on the light reflected from the target object detected by the detection unit, and determines that the identified position on the projection area corresponds to the position information judged by the judging unit.

13. The information processing apparatus according to claim 12, wherein the output control unit performs control to output the calibration image having different colors depending on positions on the projection area.

14. The information processing apparatus according to claim 13, wherein the determination unit identifies the position on the projection area pointed by the target object, based on color of the light reflected from the target object detected by the detection unit.

15. The information processing apparatus according to claim 14, wherein the determination unit identifies a position on the projection area that corresponds to the color of the light reflected from the target object detected by the detection unit as the position pointed by the target object.

16. The information processing apparatus according to claim 12, wherein the output control unit performs control to output the calibration image in which a display position of a pattern image with luminance of a specified value on the projection area changes with time.

17. The information processing apparatus according to claim 16, wherein the determination unit identifies the position of the projection area pointed by the target object, based on luminance of the light reflected from the target object detected by the detection unit.

18. The information processing apparatus according to claim 17, wherein when the luminance of the light reflected from the target object detected by the detection unit is equal to or more than the specified value, the determination unit identifies the display position of the pattern image on the projection area obtained at that point of time as the position pointed by the target object.

19. An information processing method, comprising:

detecting light reflected from a target object, which is present in an optical path of projection light projected from an image projection apparatus which projects an image on a projection object, based on a captured image captured by an image capturing unit which captures an image of the target object;

judging position information of the target object in target space, between the target object and the projection object, that corresponds to the image projected by the image projection apparatus, based on the captured image; and identifying a projection area on the projection object in which the image is projected, based on the light reflected from the target object detected in the detecting and the position information judged by the judging.

* * * * *